US008405680B1

(12) United States Patent
Cardoso Lopes et al.

(10) Patent No.: US 8,405,680 B1
(45) Date of Patent: Mar. 26, 2013

(54) VARIOUS METHODS AND APPARATUSES FOR ACHIEVING AUGMENTED REALITY

(75) Inventors: Gonçalo Cardoso Lopes, Lisboa (PT); João Pedro Gomes da Silva Frazão, Lisboa (PT); André Rui Soares Pereira de Almeida, Almada (PT); Nuno Ricardo Sequeira Cardoso, Lisboa (PT); Ivan de Almeida Soares Franco, Almada (PT); Nuno Moura e Silva Cruces, Portela (PT)

(73) Assignee: YDreams S.A., A Public Limited Liability Company, Quinta da Torre (PT)

( * ) Notice: Subject to any disclaimer, the term of this patent is extended or adjusted under 35 U.S.C. 154(b) by 184 days.

(21) Appl. No.: 12/763,011

(22) Filed: Apr. 19, 2010

(51) Int. Cl.
*G09G 5/00* (2006.01)
(52) U.S. Cl. .......................... 345/633; 345/426; 345/632
(58) Field of Classification Search .................. 345/633; 348/50
See application file for complete search history.

(56) References Cited

U.S. PATENT DOCUMENTS

| | | | | |
|---|---|---|---|---|
| 6,989,890 | B2 * | 1/2006 | Riegl et al. ................... 356/5.01 |
| 7,301,547 | B2 * | 11/2007 | Martins et al. ................ 345/633 |
| 2004/0239670 | A1 * | 12/2004 | Marks ............................ 345/419 |
| 2005/0162433 | A1 * | 7/2005 | Tonge et al. .................. 345/475 |
| 2007/0060858 | A1 * | 3/2007 | Sogard et al. ..................... 604/8 |
| 2009/0293012 | A1 * | 11/2009 | Alter et al. .................... 715/810 |
| 2010/0295821 | A1 * | 11/2010 | Chang et al. .................. 345/175 |
| 2011/0141306 | A1 * | 6/2011 | Nakano et al. ............. 348/222.1 |

OTHER PUBLICATIONS

David E. Breen, Ross T. Whitaker, Eric Rose and Mihran Tuceryan, "Interactive Occlusion and Automatic Object Placement for Augmented Reality", Proceedings of Eurographics '96 (Futuroscope—Poitiers, France, Aug. 26-30, 1996), 11-22.*
Jeffrey Ho, Jongwoo Lim, Ming-Hsuan Yang and David Kriegman, "Integrating Surface Normal Vectors using Fast Marching Method", ECCV 2006 Part III, LNCS 3953, pp. 239-250.*
Derek Chan, Hylke Buisman, Christian Theobalt and Sebastian Thrun, "A Noise-Aware Filter for Real-Time Depth Upsampling", Proc. ECCV Workshop on Multi-camera and Multi-modal Sensor Fusion Algorithms and Applications, 2008, pp. 1-12.*
U.S. Appl. No. 61/282,266, filed Dec. 10, 2009, to Nakano et al.*

* cited by examiner

*Primary Examiner* — Kee M Tung
*Assistant Examiner* — Sing-Wai Wu
(74) *Attorney, Agent, or Firm* — Notaro, Michalos & Zaccaria P.C.

(57) ABSTRACT

Various apparatus and methods are described for a simulation and/or user interface environment. Image data and actual measured depth data of a real object from a real-world scene is acquired via one or more sensors. There is matching of the resolution of the image data and actual measured depth data as well as a linking formed between the image data and actual measured depth data for each pixel representing the real-world object in the scene. The actual measured depth data of the real-world object is processed to extract normal vector data to the surface of the real-world object. occlusion, lighting, and any physics-based interaction effects are based on at least the image data and actual measured depth data.

3 Claims, 8 Drawing Sheets

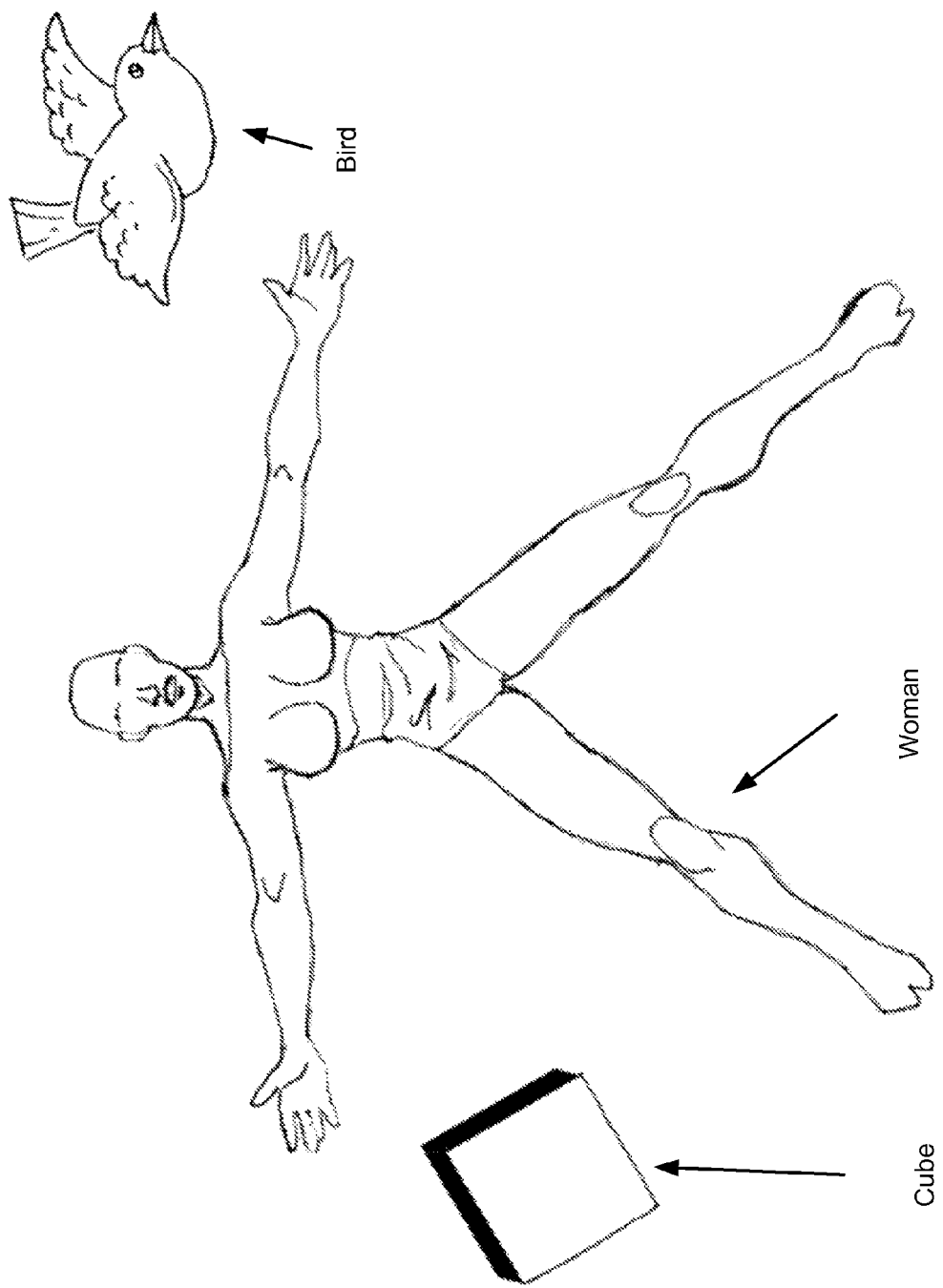

VARIOUS METHODS AND APPARATUSES FOR ACHIEVING AUGMENTED REALITY

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

FIELD

In general, embodiments may be employed in the augmented reality simulation environment, real-time computer graphics, and user interfaces.

BACKGROUND

Three-dimensional (3D) graphics processing and display screens are powerful technologies for capturing and retaining a person's attention. This is because 3D video productions and holographic display screens capture a degree of realism or invoke greater perceived familiarity that a two-dimensional (2D) production or display screen simply cannot match. 3D processing may be applied in the area of augmented reality. This term generally describes approaches to integrating information or contexts from a real environment with a virtual (or computer generated) one. Augmented reality differs from movies and most television in that the augmented reality display is performed in real-time with live participants. The augmented reality applications are generally interactive in nature such that a person captured by the camera(s) and other sensors in the system is invited to participate in some activity or experience. The real-time interface allows the participant to interact with a virtual scene or virtual 3D object and see those interactions as they happen. Tradeoffs occur in the augmented reality environment because significant computer processing requirements exist to meet the real-time interaction expectations. One of those tradeoffs in classic augmented reality consists of the superimposition of virtual elements over a real image of the objects making up the real world scene. The digital file of the real world image may be in photograph or video file format. The augmented reality simulation captures the real world image but can be very limited in the interaction with that real world image.

SUMMARY

Various methods and apparatuses are described for a computing system containing an augmented reality simulation engine. A first input of the augmented reality simulation engine is configured to receive image data of one or more real-world objects to be brought into an augmented reality simulation environment supplied from one or more image sensors. A second input of an augmented reality simulation engine is configured to receive real depth data of the real-world object(s) supplied from one or more depth-detection sensors that measure an actual distance to a surface for each of the real-world objects. The augmented reality simulation engine is configured to process depth-based interactions between a three dimensional (3D) model of the real-world object and a model of a virtual object, including 1) physics-based interactions between the real-world object and the virtual object, 2) occlusion effects depending on a relative distant position of the real-world and virtual objects, and 3) lighting effects, including shading, between the real-world and virtual objects. The occlusion effects and lighting effects may be processed by the graphics processing unit coupled to a display screen. The images of the real-world and virtual objects incorporating the physics-based interactions, occlusion effects, and lighting effects are presented back to a participant on the display screen at a real-world-time speed. The image sensor and the depth-detection sensor capture a real-world object's image data and depth data to populate the three dimensional model of the real-world object with those data points in the augmented reality simulation engine so the characteristics of the real-world object including its depth, image, and lighting characteristics can be brought inside the augmented reality processing system and treated in a similar manner to virtual objects in the augmented reality environment. The augmented reality simulation engine compares depth information of each virtual object and real-world object by using at least the depth data measurement of the real-world object's position and distance collected by the depth-detection sensor and the depth information associated with that virtual object.

BRIEF DESCRIPTION OF THE DRAWINGS

The multiple drawings refer to the embodiments of the invention.

FIG. 5a is a representation of a simulation where in a young woman and her parrot interact with a virtual cube.

FIG. 5b is a top down perspective view of the continuous surface mesh constructed in the simulation of FIG. 5a.

FIG. 6b is a top view of the extrusion for the volume of the children's bodies based on the real depth data in the simulation of FIG. 6a.

Figure 1:
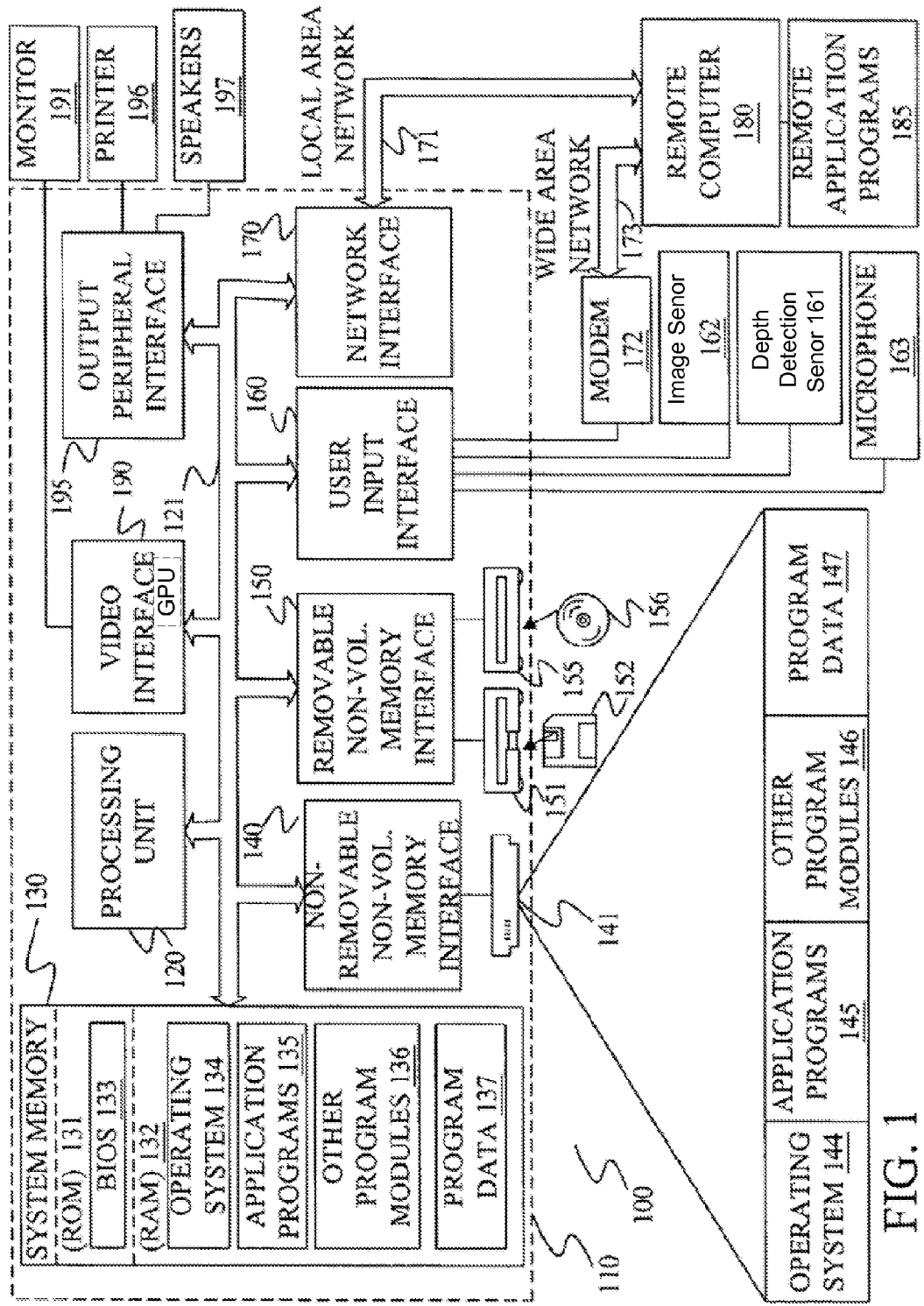
FIG. 1 illustrates a block diagram of a computing device with a built in image and depth-detection sensor, or wireless components to receive image and depth information from such sensors.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific routines, named components, connections, types of lighting effects, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

The present design relates to a system and method for a system that has depth-based interactions between models of real world objects and virtual objects. Computing system environments in which the present design can be used will be discussed in FIGS. 1 and 2. A computing-device may incorporate a representation of a real-world object, including a participant, into a virtual three-dimensional environment that is displayed back to the participant The system has depth-based interactions, including 1) physics-based interactions, such as collisions, between models of real objects and virtual objects, 2) occlusion effects depending on relative distant position of the real and virtual objects, and 3) lighting effects including shading between the real and virtual objects, all processed and displayed back to the participant in real time.

Image data and actual measured depth data from a real-world scene may be acquired via one or more sensors, between which there is matching of the resolution of the image data and actual measured depth data as well as a linking formed between the image data and actual measured depth data for each pixel representing the real-world object in the scene. The actual measured depth data of the real-world object is processed to extract normal vector data to the surface of the real-world object. A virtual model of a virtual object supplies at least a virtual image, a virtual depth data and a virtual normal vector data to the surface of the virtual object. Collisions between the virtual object and the real-world object in the virtual three-dimensional environment are processed using the actual measured depth data of the real-world object and the depth data of the virtual object. Occlusions between the virtual object and the real-world object in the virtual three-dimensional environment are processed using 1) the actual measured depth data and image data of the real-world object as well as 2) the virtual depth data and the virtual image data of the virtual object. Lighting effects on the virtual object and the real-world object in the virtual three-dimensional environment are processed using the actual measured depth data and normal vector data of the real-world object, as well as the virtual depth data and the virtual normal vector data of the virtual object. A simulation engine outputs on a display screen the virtual objects and the real-world objects, subjected to the occlusion and the lighting effects as well as any collision effects.

The use of depth information determinable for both the real world objects and the virtual objects achieves a greater consistency of an augmented reality simulation to incorporate these virtual and real world objects with the rules of reality.

FIG. 1 illustrates a computing device 110, such as a computer, PDA, iPhone, Kiosk, etc. with a built in image and depth-detection sensor, or wireless components to receive image and depth information from such sensors in which the techniques described herein may be applied. More details are described below.

Figure 2:
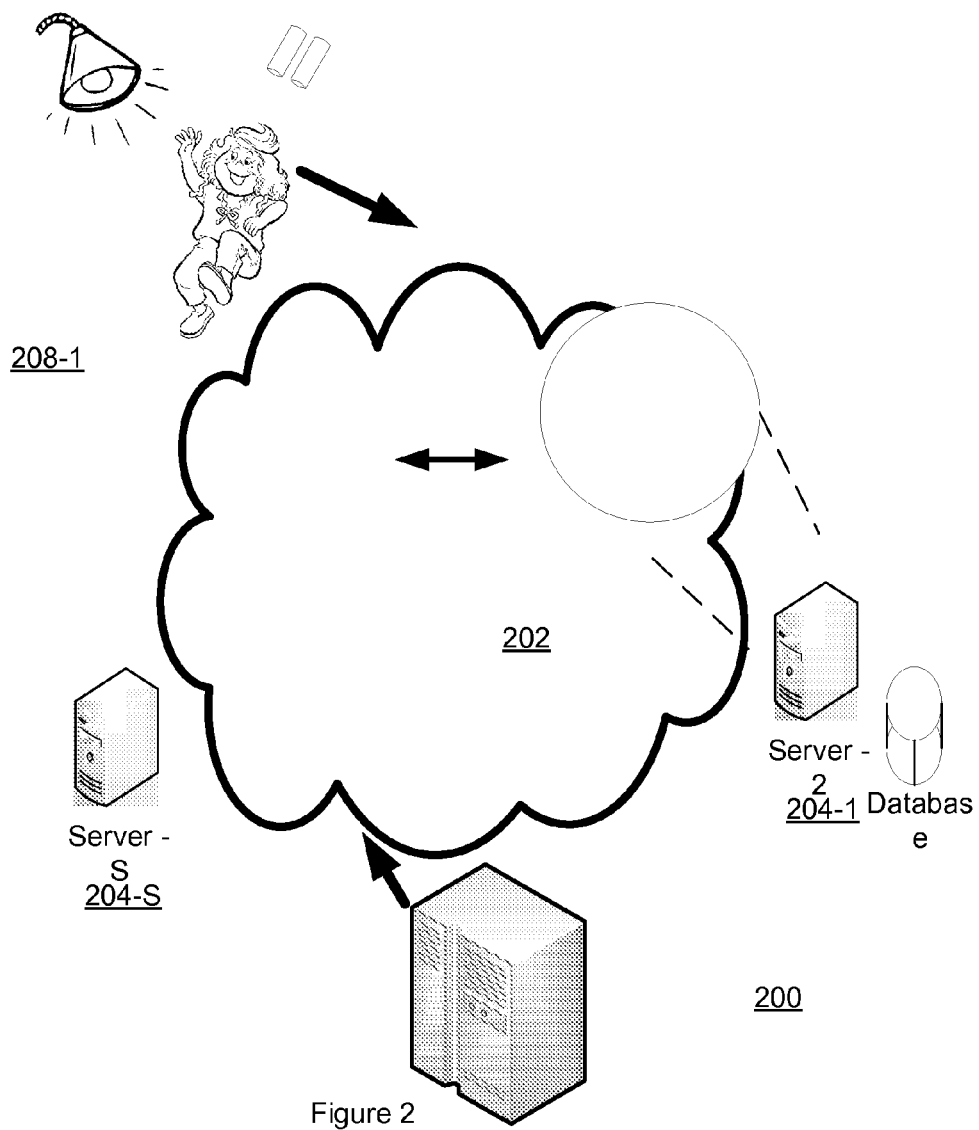
FIG. 2 illustrates a block diagram of a network environment of computing devices.

FIG. 2 illustrates a network environment 200 of computing devices in which the techniques described may be applied. The network environment 200 has a network 202 that connects S number of servers 204-1 through 204-S, and C number of clients 208-1 through 208-C. More details are described below.

Figure 3:
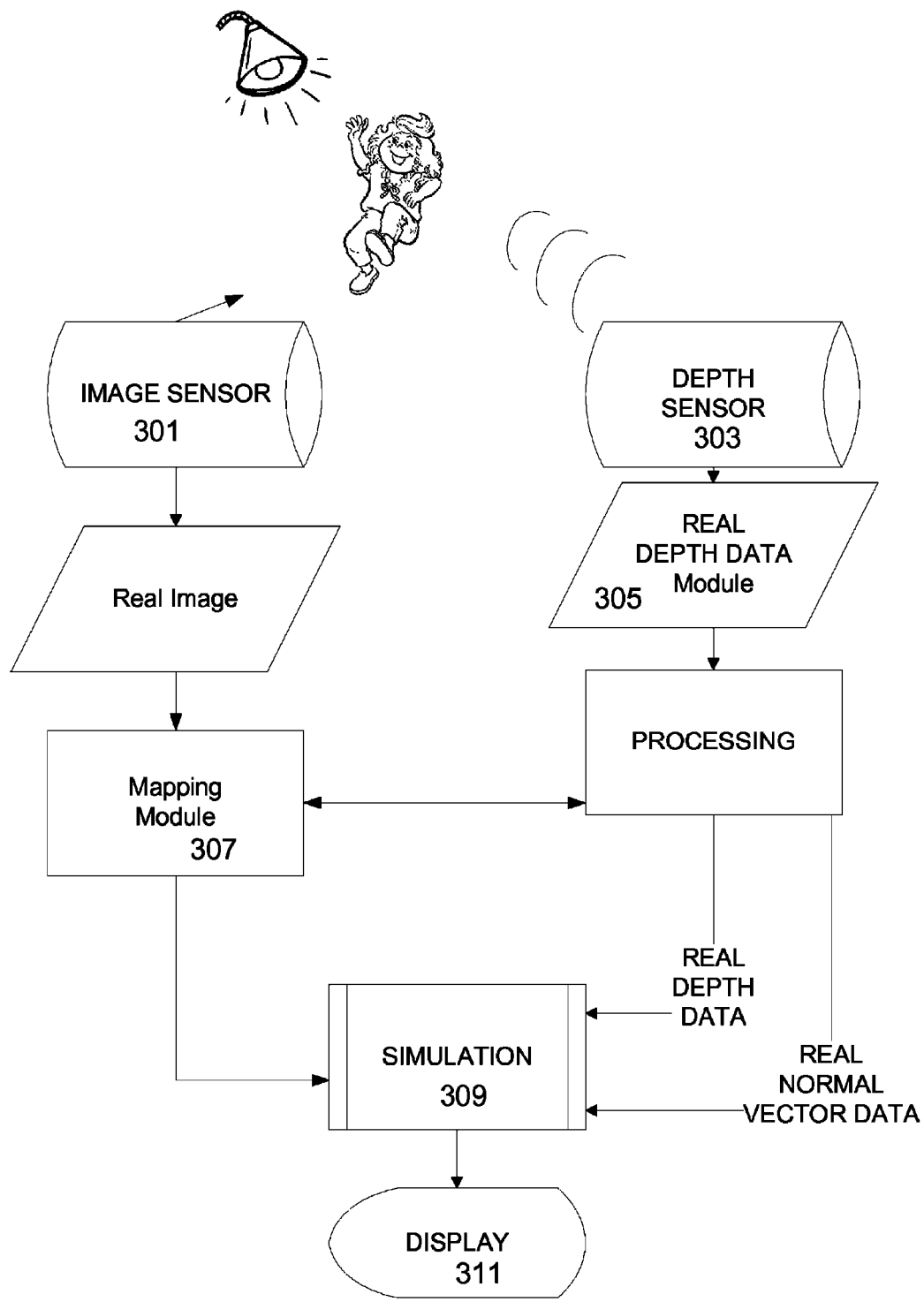
FIG. 3 illustrates a high-level perspective diagram of a process for achieving augmented reality with the image and depth-detection sensors.

FIG. 3 illustrates a high-level perspective diagram of a process for achieving augmented reality with image and depth-detection sensors. The system includes at least one or more image sensors 301, one or more depth-detection sensors 303, a real depth module 305, a real image module, a processing module, an augmented reality simulation engine 309, and a display screen 311.

The image sensor 301 and the depth-detection sensor 303 capture each real-world object's image data and depth data to populate the three dimensional model of that real-world object with those data points in the augmented reality simulation engine 309 so the characteristics of the real-world object including its depth, image, and lighting characteristics, can be brought inside the augmented reality processing system and treated in a similar manner to virtual objects in the augmented reality environment. The system enhances a participant's immersion into the augmented reality environment. One or more three dimensional models of the real world object(s), such as a participant, are populated with the characteristics of the real world object including its depth, image, lighting and other similar characteristics and are then integrated into the processes and possibilities of the augmented reality world. The end user/participant views the interaction of the one or more 3D models of real world objects with the virtual objects and virtual environment, such as lighting and shading of the augmented reality environment on the display screen 311. The virtual objects in the augmented reality simulation engine 309 interact with the one or more models of the real world object and may even react to real world conditions including lighting and shading of the real world.

The augmented reality simulation engine 309 integrates real objects from a real scene/location into the augmented reality simulation environment captured by the set of sensors that includes at least the image and depth-detection sensors 301 and 303. The acquisition of real image and real depth data is performed through the distinct sensors. These image and depth-detection sensors 301 and 303 can be embodied in single or separate devices. The two sensors 301 and 303 combine to capture both the image characteristics of the real world objects and capture the actual distance to the objects for use in telling depth of an object.

The image sensor 301 is used to capture real image data of each real world object(s) to be brought into the augmented reality simulation environment. Image sensor 301 may be any type of video camera or other camera configured to capture a stream of images. In some embodiments, image sensor 301 is a high-resolution digital camera capable of capturing accurate and high-fidelity images of the scene, including participant for greater realism, e.g. a high-resolution, 1080P, digital or analog video camera. In other embodiments, image sensor 301 is a lower resolution, monochrome, or infrared digital camera, which may reduce the processing complexity and/or provide alternative visual effects, e.g., a security camera, a webcam, or a point and shoot digital camera.

Image sensor 301 provides a stream of images or video data to the computing system discussed in FIGS. 1 and 2. For the purposes of this disclosure, video data is treated as a series of images, even though actual video data is typically encoded (to save space and/or bandwidth) into a repeating sequence of a full frame (a full image) followed by several partial frames indicating changes to the full frame. This treatment is appropriate because it is possible to decode such a repeating sequence of full and partial frames into a series of full frames by applying the indicated changes to the full frame and storing the results in memory (e.g., memory 140, 150 of the computing system 110). If the image or video data is provided by the image sensor 301 as analog data, the real image module may include an analog-to-digital converter to enable input of the image or video data into the computing system.

The depth-detection sensor 303 captures real depth data by measuring an actual distance to each part of the surface of the real world object via a mechanism such as a measurement of the time it takes for light or sound waves to reach the real world object. The depth-detection sensor 303 may be a time-of-flight camera to provide a level of depth perception using a special sensor and/or lighting elements. In yet another approach, the depth-detection sensor 303 is a laser range finder or radar setup to provide this depth information to augment video captured by the image sensor 301.

In an embodiment, the time-of-flight camera (TOF camera) is a camera system configured to measure actual distance data to the real world object with the help of the time-of-flight (TOF) principle. The time-of-flight cameras are able to measure the distances within a complete scene with one set of shots. The camera may capture images at up to one hundred frames per second or more, and as such, is ideally suited to be used in real-time applications to scan the entire scene at effectively the same point in time. Additionally, to speed up processing by the real depth module 305, depth data for known fixed real world objects in the scene/location may be filtered out of the captured data leaving computations to be performed on the detected variable real world objects, such as the participant.

The depth data of the surface of the real-world object from the depth-detection sensor 303 is processed by the real depth module 305 for the real normal vector data to determine a surface's orientation toward a light source for lighting effects, including shading, and then are supplied to a lighting module 417 in the simulation engine.

Also, an efficient distance algorithm may extract the distance information out of the output signals of the TOF depth-detector sensor, therefore this task uses only a small amount of processing power, in contrast to stereo vision, where complex correlation algorithms have to be implemented. After the distance data has been extracted, real-world object detection, for example, is also easy to carry out with a small amount of processing power because the algorithm is not disturbed by patterns on the real-world object.

The real depth data from the depth-detection sensor 303 of the real scene is inputted to the augmented reality simulation engine 309. This is actual real depth data measurement, rather than some calculated depth data for that object. Also, depth information can be determined for each pixel making up the real world object.

Figure 5B:
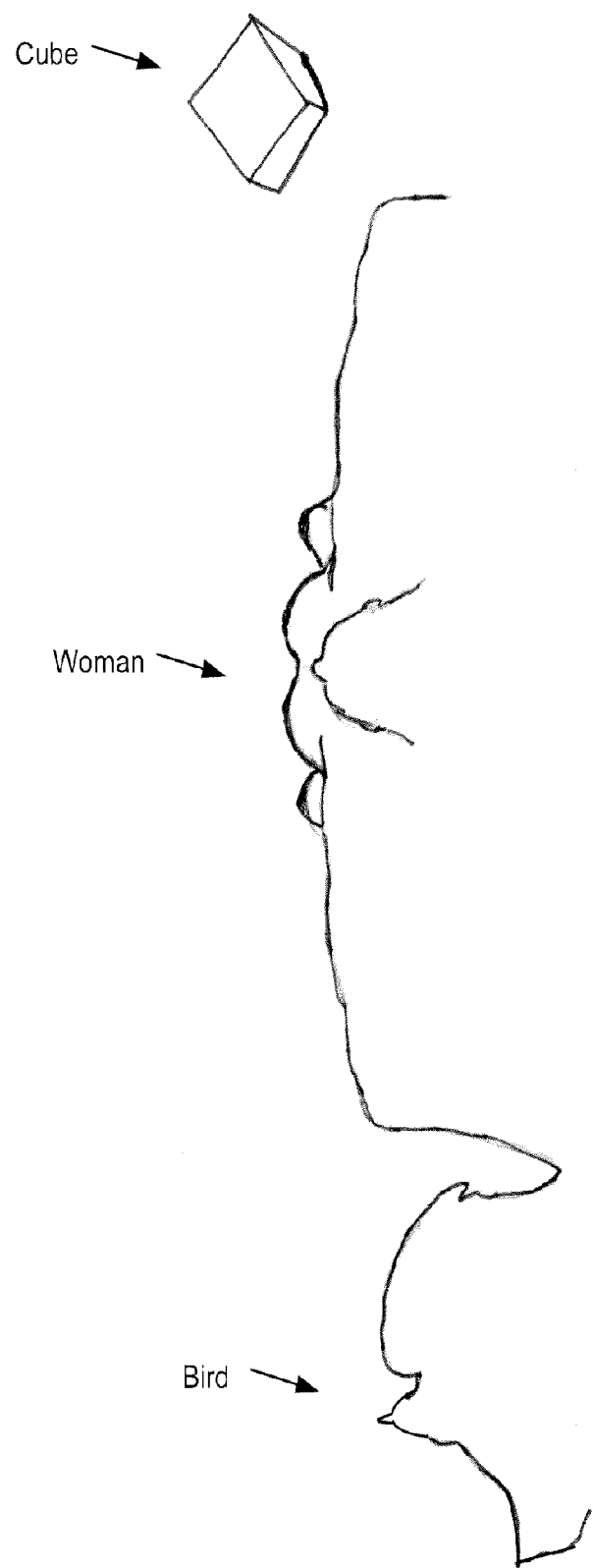

As discussed, a surface of the real world object can be determined by measurement with the depth-detection sensor 303. The augmented reality simulation engine 309 or other component may then construct a continuous mesh of the object from the real depth data, as seen in FIG. 5b. Depth data from the viewpoint of the depth-detection sensor 303 gathering the depth information in real time is automatically associated with each pixel making up the surface of the real world object. A first virtual 3D model representation of the real world object participant is automatically generated by a real-world object model-generation module in the augmented reality simulation engine 309 based on the associated depth data. An interaction between the first virtual 3D model of the real world object and a virtual 3D object can be determined by the augmented reality simulation engine 309 and then presented on the display screen 311. The system operates substantially in real-time, which can be defined as the longer time of faster than 1) the refresh rate of the display screen 311 or 2) the frame rate of the image sensor 301 or depth sensor supplying the data.

The real depth module 305 has code scripted to use filters to get rid of background surface light and other sources of noise that can affect the actual measured distance to the real-world object prior to the depth data of the real-world object being used in the occlusion, collision, and lighting processes. For example, in light based depth-detection sensors 303 filters are added to eliminate multiple reflections of the same light, because the light from the depth-detection sensor 303 may reach the real-world objects along several paths. Therefore, the measured distance to these real world objects may be wrong compared to the true distance, and the filters make this correction. Likewise, a detector may be in the real depth module 305 that detects for optical characteristics typical of transparent objects and nearly transparent materials, such as scattering of the light, in the depth data captured by the depth-detection sensor 303. Upon detection of such characteristics, the detector feeds a distance correction routine in the real depth module 305 to supply the correct depth data information for the real-world object. The real depth data may also be processed by a hole-filling filter to assist in generating a continuous mesh of the surface of the real world object.

Several types of time-of-flight cameras may be used as depth-detection sensors 303 including 1) a pulsed light source with digital time counters, 2) Radio Frequency modulated light sources with phase detectors, 3) range gated imagers and 4) other types of time of flight sensors.

The image sensor 301 and depth-detection sensor 303 each may have specially coded driver routines to assist in the image data and depth data gathering at the proper speed and resolution.

The mapping module 307 is configured to match up the captured image sensor information and depth-detection sensor information of the real-world object. The mapping module 307 may be configured to find one or more common features between the image data captured by the image sensor 301 and the depth data captured by the depth-detection sensor 303, and then match the image data with the depth data for each pixel portion of the image of the real-world object so that there is associated depth value for that pixel.

The depth-detection sensor 303 information is usually at a different resolution than the image sensor 301. Resolution is generally a measure of the amount of detail in an image and a higher resolution means more image detail. For example, a frame resolution of 1920 pixels high by 1080 M pixels wide, or about 2.07 million pixels, generally has better image detail than a frame resolution of 640 pixels high by 480 M pixels wide. The image sensor 301 at a first resolution captures the image data of the real-world object. The depth-detection sensor 303 captures depth data of the same real-world object at a second resolution, which is different from the first resolution and the mapping module 307 can match the resolution if the sensor itself does not match the image data to the depth data.

The mapping module 307 has code scripted to match up the resolution of the two sets of data from the two sensors, and convert and integrate the spatial coordinate data into a depth map to combine the matched resolution image and depth data for the three dimensional model of the real-world object in a format that the augmented reality simulation engine 309 is expecting. The actual measured depth data is used to generate a three dimensional model of the real-world object with a continuous mesh of the surfaces of the real-world object prior to the three dimensional model of the real-world object being used in the collision, occlusion and the lighting determinations. As discussed, the continuous mesh of the real-world object is generated using the actual measured depth data. The continuous mesh may also have a real volume parameter associated with the depth data relative to the point of view of a depth sensor capturing the actual measured depth data.

Thus, the actual measured depth data that is made into a continuous mesh has an associated real volume relative to the point of view of the depth sensor. The engine 309 processes depth-based physics interactions between the three dimensional model of the real-world object incorporating the continuous mesh and the model of the virtual object.

As discussed, the mapping module 307 may scale up the pixel resolution of captured pixel information from depth-detection sensor 303 to match the resolution of the image data from image sensor 301. One way that the mapping module 307 may interpolate captured pixel information from depth-detection sensor 303 is via algorithms in the graphics processing unit portion of a computing system. For example, a neighboring pixel algorithm in the GPU may be used to interpolate captured pixel information and artificially increase the pixel resolution of the depth-detection sensor data. The higher level resolution image data combined with scaled up depth-detection sensor pixel information yields the proper quality for making the occlusion and lighting effects on the 3D models and the subsequent presentation of those results on a display screen 311. In other embodiments, merely the depth-detection sensor data by itself without being scaled up is matched with the image data to be used with a low-resolution display screen 311.

Thus, the mapping module 307 performs matching between the data of the image and depth-detection sensors 301 and 303, so that the real image can be matched with the real depth data. The image sensor, such as a camera at a first resolution, captures the real world object's image data. The second depth detection sensor captures the same real world object's depth information at a second resolution, which is different from the first resolution. A feature detection routine in the mapping module 307 detects and analyzes the features that are common to the two sets of object data. A spatial map builder application then creates spatial coordinate data representing at least one common feature and compares the spatial map of the image data from the image sensor with the depth information from the depth detection sensor and matches up the maps together. The mapping module 307 has code scripted to match up the resolution of the two sets of data from the two sensors, and convert and integrate the spatial coordinate data to combine the high-resolution image and depth-detection sensor data for a model of the real world object in a format that the augmented reality simulation engine 309 is expecting.

The real depth data is also processed for obtaining normal vector data from the real fragments in the image. The real depth module 305 may be configured to process the depth data of the real-world object to extract a normal vector data to the surface of the real-world object. The real normal vector data, which consists of vectors, may be used to determine a surface's orientation toward a light source for lighting and shading. The normal vector data may be a perpendicular vector of a surface of an object that gives direction of light from the center of the light. The amount of reflected light is generally dependent on the angle of the surface that the light is reflecting from, and the type of material and other optical properties such as color, transparency, etc.

The calculation of normals may use mechanisms, e.g. Sobel algorithms, gradients, etc., to process the real depth data and extract the real normal vector data. Note, the Sobel operator calculates the gradient of the image intensity at each point, giving the direction of the largest possible increase from light to dark and the rate of change in that direction. The result therefore, shows how "abruptly" or "smoothly" the image changes at that point and therefore, how likely it is that that part of the image represents an edge, as well as how that edge is likely to be oriented.

The actual measured depth data from the depth sensor has an associated real volume parameter. The engine 309 may process lighting effects by using and including these pixel-per-pixel normal values because of the actual depth and volume information of the real world object are known.

Additionally, the same matching of the real image data with the real depth data is likewise performed for matching the real depth data with the normal vector maps.

The separate results of both the depth data and normal vector processing operations are inputted to the augmented reality simulation engine 309. Thus, both the real depth data and the real normal vector data as well as the image data from the image sensor 301 are all inputted to the augmented reality simulation engine 309.

A first input of the augmented reality simulation engine 309 is configured to receive image data of the real-world object(s) to be brought into an augmented reality simulation environment supplied from the image sensor 301. A second input of an augmented reality simulation engine 309 is configured to receive real depth data of the real-world object(s) supplied from the depth-detection sensor 303 that measured an actual distance to a surface of the real-world object(s).

Thus, the augmented reality simulation engine 309 receives at least: the real world object's image pixel information including coordinates, RGB values, etc; actual measured depth data for those pixels; and the normal vector data for the surfaces of the object captured in that pixel. Each pixel of an object captured by the image sensor 301 and depth-detection sensor 303 becomes a point in the 3D model of that object. Note, a low-resolution model may just use the pixels of an object captured by the depth-detection sensor 303.

The augmented reality simulation engine 309 is configured to process depth-based interactions between a three dimensional model of the real-world object and a model of a virtual object, including 1) collisions between the real-world object and the virtual object, 2) occlusion effects depending on a relative distant position of the real-world and virtual objects, and 3) lighting effects, including shading, between the real-world and virtual objects. The lighting and the occlusion effects may be processed by the graphics processing unit, which is coupled to the display screen 311. The real-world and virtual objects incorporating the collisions, occlusion effects, and lighting effects are then presented back to a participant on the display screen 311 at a real time speed. The augmented reality simulation engine 309 compares depth information of the virtual object and the real-world object by using at least the depth data measurement of the real-world object's position and the distance collected by the depth-detection sensor 303.

The display screen 311 can be stereoscopic, in two-dimensions (2D), or three-dimensions (3D), as the simulation runs at least in three physical dimensions. The display screen 311 can be a classic external display, e.g. monitor or hologram, or be dependent on the use of a device, e.g. a Head-Mounted Display with image superimposition capability.

The augmented reality simulation engine 309 presents the correct real and virtual objects, or at least portions of those objects, on the display screen 311 that the end user/participant should see due to the depth and lighting relationship between these real world objects and virtual objects in the augmented reality environment.

Figure 4:
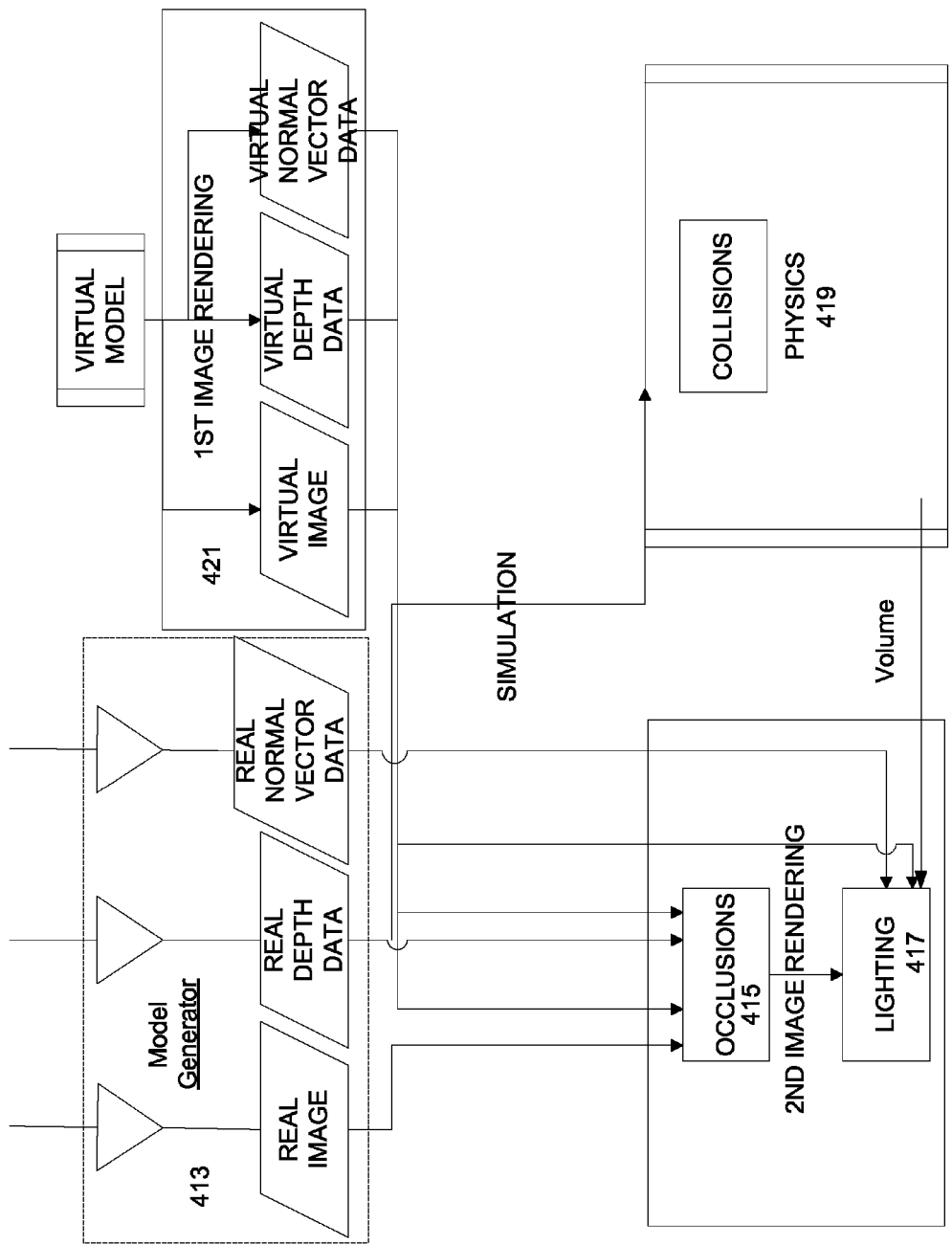
FIG. 4 is a detailed diagram of the modules in an embodiment of the augmented reality simulation engine coded to achieve an augmented reality and display that augmented reality simulation on a display screen.

FIG. 4 is a detailed diagram of the modules, in an embodiment, of the augmented reality simulation engine coded to achieve an augmented reality and display that augmented reality simulation on a display screen. The augmented reality simulation engine 409 may contain at least a real-world object model-generation module 413, an occlusion module 415, a lighting module 417, a physics engine 419, a virtual model module 421, and other similar modules. In some embodiments, the augmented reality simulation engine 409 utilizes a 3D rendering framework (e.g., OpenGL™ or DirectX™) to determine and visualize these interactions. Additionally, the physics engine 419 of the augmented reality simulation engine 409 may be a real-time physics engine (e.g., Open Physics Abstraction Layer, Bullet, or Simulation Open Framework Architecture) to control the movement and physical interactions of virtual 3D objects in the 3D virtual model. The modules may be implemented with lines of code written in a software language, configured logic gates in hardware, or a combination of both.

The real world object model generation module 413 has code scripted to populate one or more three dimensional model templates with at least depth data, image data, and the normal vector data of real world objects, and then create at least one 3D model with the image data and depth data at a resolution equal to or better than the resolution of the image sensor. The model template may be a description of one or more three-dimensional objects in a strictly defined data structure that contains data including geometry, viewpoint, depth, texture, lighting, and shading, etc. information. As discussed, each real world object may have a set of models each with its specific set of dimensions. A set of model templates may be available in a library to select which model template will be populated.

The occlusion module 415 in the augmented reality simulation engine 409 has code scripted to determine presentation of the real-world object(s) and the virtual object(s) in the augmented reality environment on the display screen factoring in any occlusion between the real-world object(s) and the virtual object(s). The occlusion (blocking the sight) of objects by others is also a clue which provides information about relative distance. The occlusion module 415 is scripted to present depth perception on the display screen so the participant visually perceives the augmented reality world in three dimensions (3D) based on the distances of objects in this environment.

The lighting module 417 in the augmented reality simulation engine 409 may have code scripted to determine the lighting effects of at least one of 1) the real-world lighting conditions on both the real-world object and the virtual object as well as 2) the lighting effects of the virtual world lighting conditions on both the real-world object and the virtual object.

The physics engine 419 has code scripted to process and control physical manipulation of physics-based interaction, including 1) collisions, such as simple touchings, between the real-world object and the virtual object, and 2) sharing of the same space in the augmented reality environment/interactions between the real-world object and the virtual object, and other similar physics-based interactions. The Physics engine 419 is scripted to control the physics of the interaction between virtual objects and modeled real world objects, including virtual objects touching, falling in front of, or behind the surfaces of the image of the 3D model of the real world object. The engine may process physics interactions between the models at a first resolution and image effects at another resolution, potentially higher than the first resolution.

The augmented reality simulation engine 409 may also immerse in this world a number of different dimensions in addition to the discussed image rendering and physics interaction, such as sound.

Real World Object Model Generation Module

The real-world object model-generation module 413 creates at least one and generally two models of the real world data so that the real world object may be transformed into a 3D-model in the virtual environment and treated like another model in the virtual environment rather than as a non-manipulatable fixed digital image superimposed in this virtual environment. The real-world object model generation module 413 in the augmented reality simulation engine 409 has code scripted to create the three dimensional model of the real-world object populated with the depth data and image data via automatically populating model templates with the data.

A first model is a push pin surface model of the real world object populated with merely information captured by the depth-detection sensor, which has a lower resolution than the captured image data. This low-resolution push pin surface model is derived from the real world depth information and once created, the model of the real world object can be treated similar to the models of virtual objects in the augmented reality simulation environment. The data in the low-resolution push-pin surface model of the real world object is transformed to provide the parameters, shapes, pixels, and other information each component in the augmented realty process is expecting to receive about a given object. The data in the low-resolution push pin surface model of the real world object is supplied to the physics engine 419 for interactions and collision determinations. Thus, the depth data in the push pin surface model of the real-world object is used in the collision determination between the virtual and real-world objects.

The second higher-resolution model of the real world object is populated with both the depth data captured by the depth-detection sensor and the image data captured by the image sensor of the real-world object. Further, both the image and depth data are set at a matched resolution. The depth data in the second higher resolution model of the real-world object is interpolated via algorithms in the graphics processing unit to match the resolution of the image sensor data.

Both of the models have a continuous mesh constructed from at least the depth data to represent the surfaces of that object, as seen in FIGS. 5.*b* and 6*b*. The image sensor data and depth-detection sensor information in the high resolution surface model of the real world object is transformed to provide the data, such as parameters, shapes, pixels, and other information, that each component in the augmented reality process is expecting to receive about a given object. The information from this high-resolution model is also then used for effects, including lighting and shadows, on both the real world objects and virtual world objects.

Overall, 1) the real world object's surface (e.g., outline) is determined, 2) the depth data is associated with the surface, 3) a 3D solid model representation of the object is populated and generated according to the depth data, and then 4) the generated 3D solid model representation of the object is introduced into a virtual 3D scene that may be displayed to the participant. Note, an object's surface (e.g., as shown in FIGS. 5*b* and 6*b*) may be a continuous curve or polygon(s) representing the outline of the real world object.

The model with 3D depth enables the augmented reality simulation engine 409 to run simulations interacting with real objects, including people, and know if the real object is in front or behind a simulation object, i.e. depth perception for the simulation program via the camera and the software. The virtual 3D representation of the participant interacts both 1) physically, as determined by the physics engine, and 2) in other ways, such as occlusion, lighting, sound etc., with other virtual elements in the virtual 3D scene, and these interactions are displayed to the participant.

In an embodiment, at any given time there may be only the real depth data of the object's surface available, such as the bird's body and woman's body in FIG. 5b that are facing the depth-detection sensor. An amount of volume occupied can be assigned to each pixel from either 1) a set amount or 2) when a real world object character recognition program is used, then obtaining a volume estimate from cross referencing the recognized real world object on a look up table or matrix with its expected area that will be occupied for that portion of the recognized real world object. Also, extrusion may be used to create a fixed cross-sectional profile of the object that can be used based on the real depth data to better simulate the real volume of the real object. When extrusion of a participant's surface by a uniform depth occurs, then a solid volume for the object is generated. The system may determine the extrusion depth for a particular participant based on any one or more of the following factors:

(a) the physical location of the participant (e.g., as determined using a location algorithm compared to a known object's location in the scene or look-up table);
(b) the height of the participant (e.g., as determined using a height algorithm compared to a known object's height in the scene or look-up table);
(c) a width or other dimension of the participant (e.g., as determined using an algorithm compared to a known object's width in the scene or look-up table);
(d) the type of participant (e.g., person, animal, cart, etc.) identified by recognition software in the real image module (e.g., by comparing the participant surface with a number of pre-defined reference surfaces);
(e) the orientation of the participant (e.g., whether a human participant is facing the camera directly or sideways, which system may determine automatically by comparing the participant surface with a number of pre-defined reference surfaces corresponding to various orientations); and/or
(f) any other suitable factors.

In other embodiments, the extrusion depth may be a standard pre-determined depth for all participants.

Likewise, a parameterized value can be applied to each real depth value so that there is continuity following the perspective of the camera, and so the engine achieves the presence of solid representations from the real depth data within the simulation. A way of implementing this method, depicted in FIG. 6.b, is to draw straight lines from the point of view towards the children's bodies until the initial real depth value is present, and then to extend the real depth value for a parameterized length. For each discrete depth data a parameter of length is associated, resulting in a voxel, prior to the real depth data being used in the collisions, occlusions and lighting. FIG. 6b is a top view of the extrusion in the simulation of FIG. 6a. The voxel (volumetric pixel) is a volume element, representing a value on a regular grid in three-dimensional space. The voxel is analogous to a pixel, which represents 2D image data in a bitmap. The position/coordinates of a voxel may be absolute coordinates of the grid, making up the scene of the real world or inferred based upon its position relative to other voxels (i.e., its position in the data structure that makes up a single volumetric image).

The physics engine 419 processes physics-based interactions including 1) collisions between the real-world object and the virtual object, and 2) sharing of the same space in the virtual three-dimensional environment between the real-world object and the virtual object using the actual measured depth data of the real-world object and the depth data of the virtual object. A collision event in the physics engine 419 may operate based on touching tangents of objects. The physics engine 419 is coded and handles the processing of physics that includes collisions, sharing of space, as well as other physics based processes. For example, the physics engine may process an interaction between objects that is based on a hand sharing the same space as a virtual ball, where the ball does not collide with the hand, but a sound is played while the hand shares space with the ball.

The Occlusion Module

A first image rendering occurs in the virtual model module 421 for the virtual objects in the augmented reality environment. The model of the virtual object stores depth data, image data, and a virtual normal vector data to the surface of the virtual object. In the simulation, there exists an already generated model from which the augmented reality simulation engine 409 can obtain or extract at least the virtual object's: virtual image data, virtual depth data, and virtual normal vector data.

A second image rendering occurs in the occlusion module 415 using the GPU hardware while the physics engine 419 computes interactions between the virtual object's model from the first rendering and the low-resolution push pin surface model of the real world object with a processor from the computing device. The occlusion module 415 processes occlusions with the second image rendering using data from the second model of the real world object captured by the image sensor and depth-detection sensor which has the depth-detection sensor information interpolated and increased to the resolution of the image sensor.

The virtual model module for the virtual object in the augmented reality environment may be used to supply the virtual image data and the virtual depth data to the occlusion module 415. The three-dimensional model of the real-world object may be used to supply the image data and the depth data to the occlusion module. The occlusion module 415 then uses this data to determine occlusions between the real-world object and the virtual object.

The occlusion module 415 processes occlusions using the real depth data, the real image, the virtual depth data and the virtual image. The occlusion module 415 compares depth data for each pixel fragment from both of the models of the real-world and virtual objects, relative to a reference point of view, and chooses to render for display whichever pixel fragment is closer to the reference point of view. An algorithm in the occlusion module 415 does this for every pixel in the real-world and virtual objects where the detection of a possible occlusion exists. Where no possibility of occlusion occurs, the pixels of the object may be rendered in the second rendering by default to increase performance of this step. The fragments from that point of view are covered by other closer fragments that are depth-culled.

This can be done through a process of depth-buffering, in which we have two depth maps. A first depth map for the real-world object is generated by the occlusion module 415, based on at least the measured depth data from the depth-detection sensor. A second depth map for the virtual object is generated by the occlusion module 415, based on at least the virtual object's associated depth data. The depth maps are used to compare relative depth of the pixel fragments making up each of the virtual and real-world objects. The occlusion module 415 performs the process of depth-buffering, in which the first and second depth maps have a rule applied that a minor value of depth, which represents the closest pixel fragment to a reference point of view, commands that the associated pixel fragment is rendered. The occlusion module 415 may process occlusions with the entire image of the scene and does not segment the entire image of the scene for individual processing.

Thus, the occlusions between the real-world and virtual objects are processed by rendering the image for each pixel element of the objects that share common coordinates, then the pixel element that has a value indicating this object is closer to the reference point of view based on the depth data information is rendered for presentation on the display screen. Note, using the depth buffers in the GPU for invalidating image regions before computing the map makes this step much faster. Also note, in previous techniques it made no sense to depth-buffer or depth-cull because these techniques require a per-pixel or approximate per-pixel resolution and those capabilities were not present in the augmented reality prior art.

In the occlusion module 415, when a virtual object has depth values lower (i.e. closer) than those of the mesh for the 3D model of the real world object, then the real world object is occluded and the virtual object is rendered and vice versa. Also, when a virtual object has a partial amount of depth values indicating closer to the reference point than those of a continuous mesh for the three dimensional model of the real-world object and a remaining amount of depth values indicating farther away from the reference point than those of the continuous mesh, then portions of the virtual object with closer depth values are rendered and portions of the virtual object with depth values indicating farther away are occluded.

In some embodiments, after the occlusion determination is made, then the real image characteristics are applied to the mesh that is being rendered, and the virtual image is applied to the virtual objects that are being rendered.

Routines in the augmented reality simulation engine 409 may be scripted to use hardware components in a graphics card hosting the graphics processing unit to perform the processes of 1) maintaining the depth data values for both the real-world object and the virtual object 2) performing the comparison between the depth data values for both the real-world object and the virtual object, 3) rendering a virtual image onto the virtual object, 4) storing and assigning the image data of the real-world object to be rendered on a continuous mesh of a surface of the real-world object derived from the real depth value, and 5) rendering a real image onto the real-world object.

The Lighting Module

The lighting module 417 has code scripted to process the lighting effects, which includes the projection of light and shadows. As discussed, the occlusion module 415 located in the augmented reality simulation engine 409 has code scripted to determine presentation consistency relating to depth between virtual and real-world objects and what portions of the virtual and real-world objects will be presented based on their depth. After the occlusion module 415 determines presentation consistency relating to relative depth between virtual and real-world objects, then the lighting module 417 processes the depth data to project light and shadows on the portions of the virtual and real-world objects that will be presented.

In some embodiments, the lighting module 417 limits determining a lighting effect on a pixel of an object within the simulation to operation from virtual lights. Real objects will be naturally lighted and shadowed from real lights, independently from the lighting module 417 methods and processes.

In other embodiments, the lighting module 417 processes lighting using all four of the real depth data, the real normal vector data, the virtual depth data and the virtual normal vector data. The lighting module 417 determines the lighting effects for each pixel element of the real-world and virtual objects to be proportional to the dot product between the vector of the direction of the light and the normal vector of the pixel element of that object. Thus, given the sources of light, light intensity for each pixel is computed through the dot product between the light direction vector pixel and the corresponding normal vector.

When the system uses a mechanism way to map where all the real light(s) are located, such as a dynamic detector or manually entering location of light source, the lighting module 417 can also project virtual light and shadows from the real light(s) to virtual fragments, through application of homologous virtual light(s) to the virtual fragments alone. Conversely, given good enough approximations to the real lighting system, the lighting module 417 can also operate compensation for the real lights and shadows on real objects, so that just virtual lights and shadows are seen in effect. For example, a dynamic detector may detect the position and orientation of the real world light source by initially scanning for the light sources and noting the position and orientation.

The lighting module 417 determines the angles of the surfaces of the real-world object and virtual object via the normal vector calculation on the virtual and real-world objects relative to where the direction of the light is coming from. The lighting module 417 may also apply a number shading algorithms to the real world and virtual objects. The lighting module 417 includes information on a volume occupied by the real-world and virtual objects when determining any shadow effects. The volume associated with the real world and virtual objects can be obtained from the physics engine 419. The volume occupied can also be determined by algorithms in the depth-detection sensor and appended onto each pixel of the object coming from the depth-detection sensor; however, all the processing of the two models through the occlusion and lighting determinations as well as the physics interaction and collision determination occurs in real time as the participant views themselves in the augmented reality environment. Depth, volume and other similar information may be attached to the standard pixel data of a captured object as metadata.

The lighting module 417 projects shadows from any virtual light source by exclusion, i.e. when a primary pixel fragment of a virtual object is in a vector of projected virtual light from the virtual light source and a secondary pixel fragment of the real-world object in the same vector but located farther away from the virtual light source based on the depth data associated with the primary and secondary pixel fragments, then the secondary pixel fragments will receive an amount of light that is less than that received by the primary fragment in addition to any simple light decay effects applied.

The lighting module 417 makes shading determinations between the objects by also incorporating the volume information for the real-world object and the virtual object. The effects of the real world object's shading can be applied to the virtual objects and the virtual objects shading effects can be applied to the high resolution model of the real world object. Note, the way that light falls on an object and reflects off its surfaces, and the shadows that are cast by objects provide an effective cue for the brain to determine the shape of objects and their position in space.

The lighting module 417 also determines color intensity, lighting effects including shadow effects, and other similar effects on both the real world objects and the virtual world objects. The lighting module 417 processes the lighting effects on the real-world object and the virtual object using both 1) the image data, depth data and normal vector data of the real-world object, as well as 2) the virtual image data, virtual depth data and the virtual normal vector data of the virtual object. The lighting module 417 may lastly render the models to give the final appearance to the image of the models and their animation on the display screen.

Speed

The processing of the occlusion and the lighting can be operated by any kind of general processor. There is, however, advantage in sending the processing of the occlusion and the lighting to a dedicated graphics processor, since its massively parallel architecture presents a time-of-execution advantage in the processing. The real time processing of the models is achieved via parallel processing of the different renderings. The lighting and occlusion modules 415, 417 can be coded to use the graphics processing unit to execute their instructions. The physics engine 419 uses a processor in the computing system, which could be multiple core CPU processor, to execute its instructions and additionally the physics engine 419 is specifically coded to take advantage of multiple core processing. The physics engine 419, the occlusion module and the lighting module may be scripted to take advantage of multiple core processing. The occlusion and lighting modules 415, 417 may use the parallel architecture of the GPU to increase computational speed used as well as real-time shaders programs, which are specifically coded to execute on the GPU and other hardware of the graphics card.

As shown in FIG. 5*a*, the virtual 3D scene is displayed to the participant in real time such that the participant and her bird can move around within the field of view of the camera to interact with the virtual objects such as cubes. The processing time from image capture to display of the virtual 3D scene may be substantially in real-time such that the participants can coordinate their movements relative to the virtual objects such as cubes.

In some embodiments, a true, real-time scheduling environment is utilized such that processing of the virtual 3D scene is guaranteed to occur as least as fast as the input frame rate from the camera or the refresh rate of the display whichever is longer. Note, the input frame rate may be the camera frame rate or a selected subset of frames captured by the camera (e.g., only processing every fourth frame from the camera, which is capturing sixty frames per second, gives an input frame rate of 15 frames per second). Note, an occasional inability to process a frame in time may occur, much like a dropped frame on a digital video stream of a sporting event, however the participant substantially will not notice the dropped frame as she sees the progress of the simulation.

The Physics Engine

The physics engine 419 performs continuous physical interaction, including collisions and interference detection, and physics resolution between the models of the virtual complex objects and the model of the real world objects, all set into the virtual reality environment moving according to general three-dimensional physics principles in a spatial map. The simulation comprises a physics dimension, which can receive the push pin surface model of the real world object. Objects in the simulation are under a set of laws of physics at any given time. Inclusively, when objects touch, that event is processed through the set of laws of physics scripted into the code for the physics engine 419. Generally, the laws of physics within the simulation have no discernible difference with the natural laws of physics as experienced by a user of the simulation. The real world and virtual objects may have a volume associated with each pixel making up that object. A mass parameter can be associated with the portion of the pixels of the real world object interacting with a virtual object.

As discussed, physics are simulated to process physical interactions, including collisions between different virtual objects, and between virtual objects with real objects. Having the virtual model of the virtual objects present in the simulation, the physics engine 419 may use the continuous mesh constructed from the real image to process the collisions. Thus, the physics engine 419 uses the real depth data in calculations with the virtual depth data, present within the simulation's virtual model, to be able to determine the relative position of the real fragments in relation to the virtual fragments.

The augmented reality simulation engine 409 outputs the image of the real world object(s) and the image of the virtual object(s), subjected to the occlusions and the lighting, and physics interactions between the objects to a display screen. The output of the physical interactions from the physics engine 419, such as pressing a button or turning a page, can also be fed as a trigger to another module.

FIG. 5*a* is a representation of a simulation where in a young woman and her parrot interact with a virtual cube. The real image from the image sensor and subsequent model may be that of a young woman and her pet bird.

The example three-dimensional (3D) dynamic simulation has a virtual model of cubes being generated at a parameterized range from the origin of the simulation. The cubes are slowly moving towards the origin of the simulation. The cubes are not just floating in 3D space, but also have an associated rotation, which direction and intensity is defined in a manner randomized by the simulation.

The real depth data of the bird and woman is used to generate a continuous mesh for the real world models as seen in FIG. 5*b*. FIG. 5*b* is a top down perspective view of the continuous surface mesh constructed in the simulation of FIG. 5*a*. For example, the push pin surface model of the real world objects of the woman and bird is shown as well as the virtual model of the cubes. Note, the 3D model of the real world objects both have depth and volume parameters populated in that model. The mesh functions to operate occlusions and lighting effects with the virtual cubes.

When a cube has depth values lower than those of the mesh, then the mesh is occluded and the cube is rendered. When a cube has depth values higher than those of the mesh, then the cube is occluded and the mesh is rendered. When a cube has partial depth values lower than those of the mesh and partial depth values higher than those of the mesh, then such parts are respectively rendered and occluded.

The real image may be applied to the mesh that is being rendered, and the virtual image is applied to the cubes that are being rendered.

Likewise, lighting effects between the real and virtual objects is performed on the rendered fragments, by using both real normal vector data and virtual normal vector data. For this, a virtual light situated outside view, to the top and the right of the young woman and her parrot is applied to the rendered real fragments, which are the young woman and her parrot, and also to the virtual cubes (rendered virtual fragments).

Shadows are projected based on the same virtual light, and so cubes that are to the right of the young woman will project shadow relative to that light on the young woman, within the simulation.

As discussed, the simulation engine process collisions through the physics engine. Having the virtual model of the cubes present in the simulation, the simulation engine uses the continuous mesh constructed from the real image to process the collisions. When the cubes contact the mesh, they behave accordingly to the nature of the contact; e.g., when the young woman moves her hand intently to touch a cube, the cube is propelled in the direction of the gesture. When a cube hits the parrot, it may just be slightly deflected and alter its rotation intensity and/or direction. This difference in behavior can be explained by the difference in mass between the young woman and her parrot.

Figure 6A:
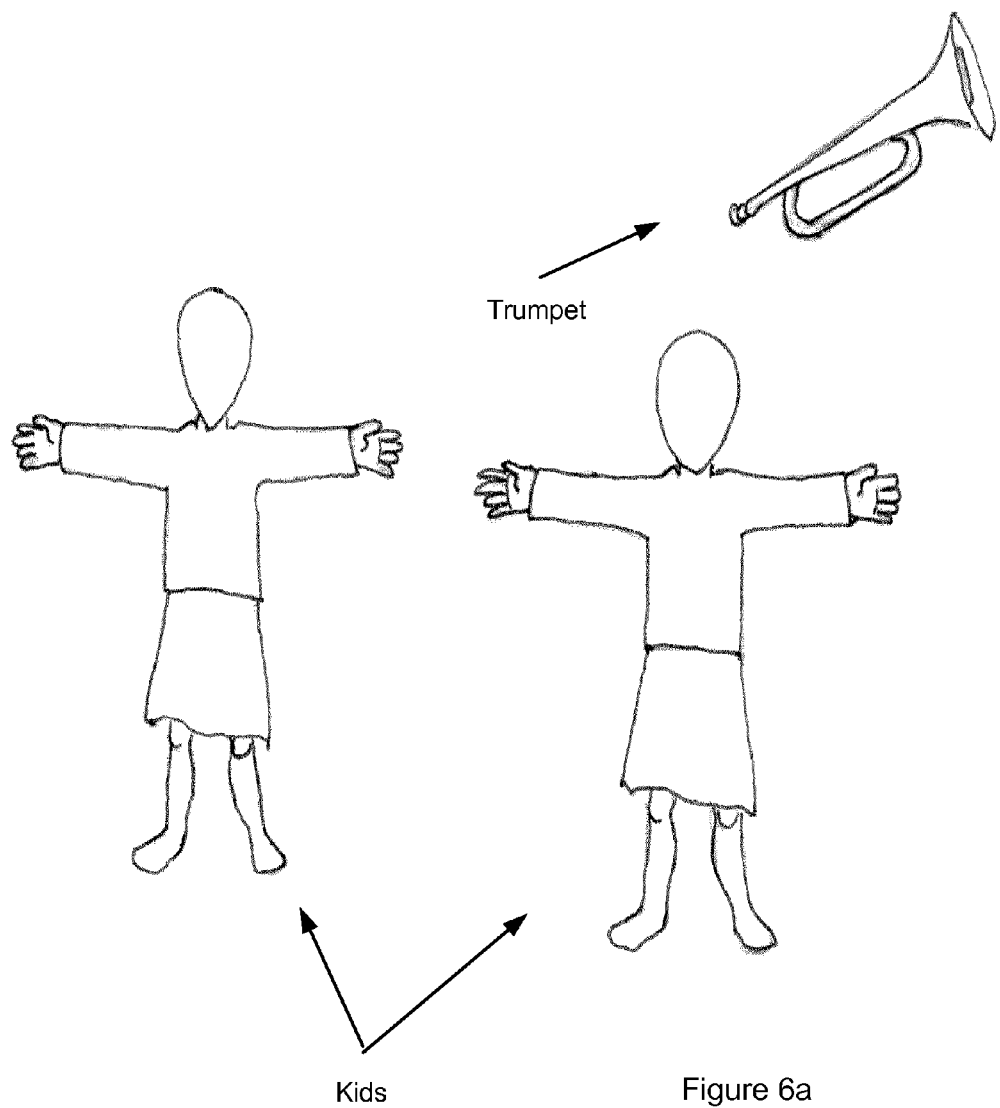
FIG. 6a is a representation of a simulation wherein two young children interact with falling virtual objects.
Figure 6B:
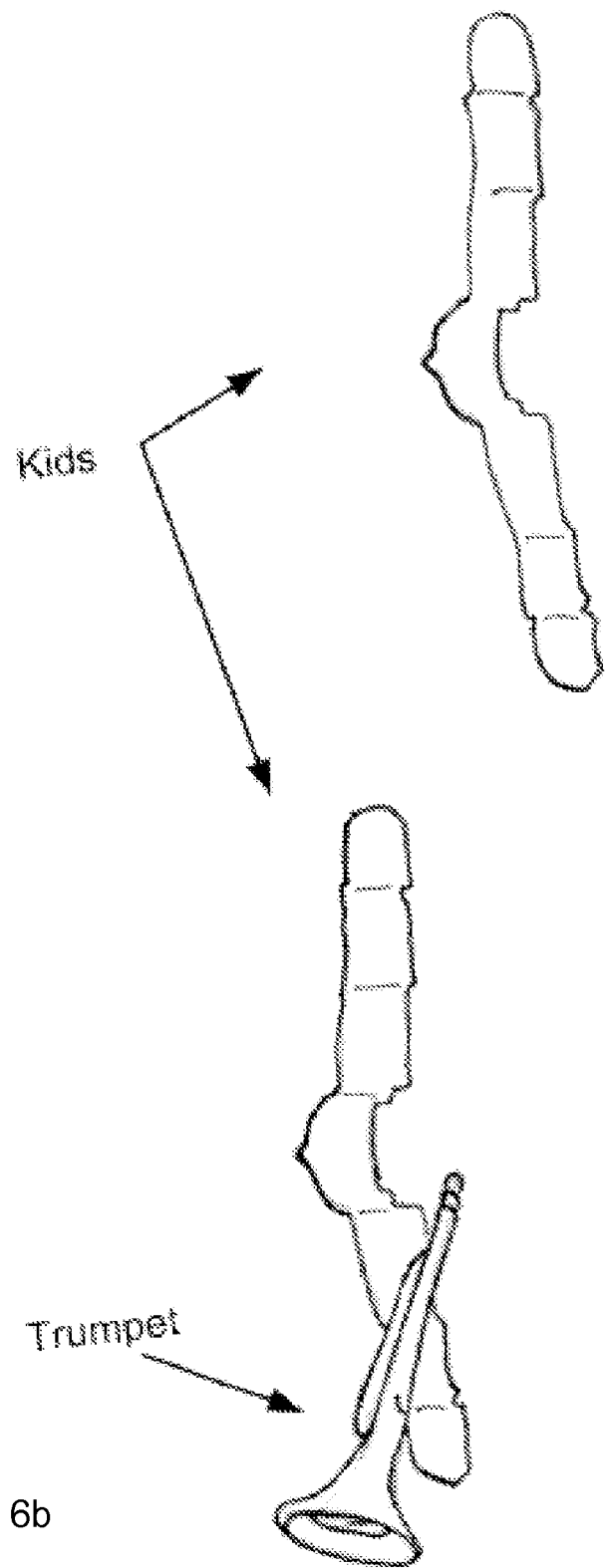

FIG. 6a is a representation of a simulation where in a two young children interact with falling virtual objects. The real image from the image sensor and subsequent model may be that of the two young children. The two children play a collaborative game of catching the falling virtual objects, including the trumpet. The two children position themselves facing a screen, and take notice of the position of falling virtual elements displayed on the screen that are relative to their own position, as per FIG. 6a, in order to position themselves effectively.

In the simulation, there is a 3D space in which the virtual elements drop at a constant moderate velocity from the top of the space to be displayed on the screen. The depth-sensing camera captures the real image from the scene where the two children are, and also the real depth data of the same scene.

As, at any given time, the depth sensor may only capture the real depth data of the real object's surface that is facing the camera, such as the children's bodies, and that is not occluded by itself or any other real object. Extrusion or another technique described above may be used to better simulate the real volume of the children's bodies based on the real depth data. The real depth module that has code scripted to parameterize a value applied to each real depth value from the depth-detection sensor so that there is continuity following the perspective of the depth-detection sensor, and so the augmented reality simulation engine achieves the presence of solid representations from the real depth value within the simulation.

A way of implementing this method, depicted in FIG. 6.b, is the real depth module draws a straight line from the point of view towards the real-world object, the child's body, until an initial real depth value is present, and then the real depth value is extended for a parameterized length. Thus, as discussed, for each discrete depth data point, a parameter of length is associated, resulting in a voxel for that discrete depth data point, where the depth data of the real-world object in the voxel format is generated prior to being used in the occlusion, collision, and lighting processes. FIG. 6b is a top view of the extrusion for volume of the children's bodies based on the real depth data in the simulation of FIG. 6a.

As the virtual elements will fall from the top at different widths and depths, the children must not only move sideways, but also back and forth to catch the virtual element. When the children are at the right place to catch a virtual element, which in terms of the simulation consists of their extruded surfaces sharing space with the virtual elements, then the virtual elements disappear and an effect is achieved. For instance, a child successfully catching a chocolate might give her 30 points to a cumulative score, and catching a bowling ball might remove 10 points from the same score; catching a trumpet might give 50 points and cause a pre-existent trumpet sound to be played.

Note various other interactions are possible between the virtual 3D representation of the real world object and the virtual objects such as the trumpet in the displayed virtual scene. For example, contact between the virtual participant and a virtual horn may cause the virtual horn to stick to the virtual participant, bounce, or play music. As another example, a virtual horn may pass in front of or behind the virtual participant. If a virtual horn passes in front of the virtual participant, it may completely or partially obscure the displayed view of the virtual participant and may cast a shadow on the virtual participant. Alternatively, a virtual horn may distort a part of the image of the virtual participant rather than obscure it. If a virtual horn passes behind the virtual participant, the virtual horn may disappear on one side of the virtual participant and then reappear on the other side. As yet another example, if there are two or more virtual participants such as the two children, a virtual horn may pass between two of the virtual participants or pass by one and collide with another.

The augmented reality system described above may be used in games and other entertainment venues, shopping experiences—for example viewing how virtual clothing, virtual jewelry, virtual shoes, etc. will look on the real-world person as shown back to the person on the display screen, meetings and teleconferencing, new interfaces for retail, Interactive TV, visualization interfaces, and other similar products and venues.

FIG. 1 illustrates a block diagram of an example computing system that may use an embodiment of one or more of the software and computing applications discussed herein. The computing system environment 100 is only one example of a suitable computing environment and is not intended to suggest any limitation as to the scope of use or functionality of the design. Neither should the computing environment 100 be interpreted as having any dependency or requirement relating to any one or combination of components illustrated in the exemplary operating environment 100.

The design is operational with numerous other general purpose or special purpose computing system environments or configurations. Examples of well known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, including smart phones and personal digital assistants, network PCs, minicomputers, mainframe computers, distributed computing environments that include any of the above systems or devices, and the like.

The design may be described in the general context of computing device executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computer readable media discussed below.

The design may also be practiced in distributed computing environments where tasks are performed by remote processing devices that are linked through a communications network. In a distributed computing environment, program modules may be located in both local and remote computer storage media including memory storage devices.

The computing system may include a video camera 162, a depth-detection sensor 161, a display screen and other parts of a computer system. A participant (i.e., a person) may stand on a targeted field with a point of contact between the participant and the target field in the view of the camera. The system may also include one or more reference markers, e.g., reference markers to be used in the augmented reality application resident in the system. The display displays a view of a virtual 3D scene that includes a virtual participant (which is a virtual 3D representation of participant) interacting with one or more virtual objects responding to the presence of the virtual 3D representation of participant. The System 100 may be in communication with one or more other systems to allow shared elements in virtual scenes. In some embodiments, the video camera, depth sensor, display screen, and computer system may be incorporated into a single kiosk or other integrated structure while in others they may be physically separated components coupled via wires and/or wirelessly. In some embodiments, multiple cameras and displays may be used with one or more computer systems.

Accordingly, with reference to FIG. 1, the exemplary computing system for implementing the design includes a general-purpose computing device in the form of a computer 110. Components of computer 110 may include, but are not limited to, a processing unit 120 having one or more processing cores, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard, a microphone 163, and a pointing device, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A display screen 191 or other type of display device is also connected to the system bus 121 via an interface, such as a video interface 190. The video interface 190 component may contain its own graphics processing unit.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet. A browser application may be resident on the computing device and stored in the memory.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Another device that may be coupled to bus 111 is a power supply such as a battery and Alternating Current adapter circuit. As discussed above, the DC power supply may be a battery, a fuel cell, or similar DC power source that needs to be recharged on a periodic basis. The wireless communication module 172 may employ a Wireless Application Protocol to establish a wireless communication channel. The wireless communication module 172 may implement a wireless networking standard such as Institute of Electrical and Electronics Engineers (IEEE) 802.11 standard, IEEE std. 802.11-1999, published by IEEE in 1999.

A mobile computing device may have one or more application resident on the client device configured to work with the application resident on the server. Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Referring back to FIG. 2, FIG. 2 illustrates a network environment 200 in which the techniques described may be applied. The network environment 200 has a network 202 that connects S servers 204-1 through 204-S, and C clients 208-1 through 208-C. Clients 208-1 through 208-C may have built-in image and depth-detection sensors or merely wireless components and software built-in to receive image and depth information from such sensors. As shown, several systems in the form of S servers 204-1 through 204-S and C clients 208-1 through 208-C are connected to each other via a network 202, which may be, for example, an on-chip communication network. Note that alternatively the network 202 might be or include one or more of: inter-chip communications, an optical network, the Internet, a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). Both functions may be in a single communicating device, in which case the client-server and server-client relationship may be viewed as peer-to-peer. Thus, if two devices such as 208-1 and 204-S can both initiate and respond to communications, their communication may be viewed as peer-to-peer. Likewise, communications between 204-1 and 204-S, and 208-1 and 208-C may be viewed as peer to peer if each such communicating device is capable of initiation and response to communication.

An application as described above, when executed on a server 204, causes the server 204 to display windows and user interface screens on a portion of a media space such as a web page. A user from a client machine 208 may interact with the page that contains the embedded application, and then supply input to the query/fields and/or service presented by a user interface of the application. The web page may be served by a web server 204 on any HTML or WAP enabled client device 208 or any equivalent thereof such as a mobile device or personal computer. The client device 208 may host a browser to interact with the server. Each application, widget, Plug in, etc. has a code scripted to perform the functions that the software component is coded to carry out such as presenting fields and icons to take details of desired information.

In an embodiment, the software used to facilitate the functions and processes described herein can be embodied onto a machine-readable medium such as computer readable medium as discussed above.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These routines, algorithms, etc. may be written in a number of different programming languages. Also, an algorithm may be implemented with lines of code in software, configured logic gates in hardware, or a combination of both. The portable application and its security mechanisms may be scripted in any number of software program languages.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown, the invention is not to be limited to these embodiments. The invention is to be understood as not limited by the specific embodiments described herein, but only by the scope of the appended claims.

What is claimed is:

1. A method for dynamic image processing, comprising the following steps:
   a) acquiring real image data through a first sensor and real depth data through a second sensor from a real scene, the real image data and the real depth data being matched one to another;
   b) processing the real depth data to extract real normal vector data;
   c) generating and running a virtual model from which there can be extracted, at least, virtual image, virtual depth data and virtual normal vector data;
   d) processing occlusions in a physics engine using the real image, the virtual image, the virtual depth data and a continuous mesh generated from the real depth data;
   e) processing lighting using the real depth data, the real normal vector data, the virtual depth data and the virtual normal vector data; and
   f) outputting the real image and the virtual image, subjected to the occlusions and the lighting, to a display.

2. The method of claim 1, wherein to each discrete depth data, a parameter of length is associated, resulting in a voxel, prior to the real depth data being used in the occlusions and lighting.

3. The method of claim 1, wherein the lighting for each element of the picture is proportional to the dot product between the vector of direction of the light and the normal vector of the element of the picture.

* * * * *